United States Patent
Lee (10) Patent No.: US 8,115,897 B2
(45) Date of Patent: Feb. 14, 2012

(54) LIQUID CRYSTAL DISPLAY

(75) Inventor: Sang-Duk Lee, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 240 days.

(21) Appl. No.: 12/468,960

(22) Filed: May 20, 2009

(65) Prior Publication Data

US 2010/0128201 A1 May 27, 2010

(30) Foreign Application Priority Data

Nov. 27, 2008 (KR) .................. 10-2008-0119142

(51) Int. Cl.
*G02F 1/1333* (2006.01)
(52) U.S. Cl. .................. 349/150; 349/139; 349/151
(58) Field of Classification Search .................. None
See application file for complete search history.

(56) References Cited

U.S. PATENT DOCUMENTS

| 2002/0149074 A1 | 10/2002 | Imaeda |
| 2003/0043104 A1 | 3/2003 | Lee et al. |
| 2006/0125981 A1 | 6/2006 | Okuda |
| 2007/0046884 A1 | 3/2007 | An et al. |
| 2008/0030645 A1* | 2/2008 | Nam et al. .................. 349/61 |
| 2008/0043193 A1 | 2/2008 | Oke et al. |
| 2010/0073618 A1* | 3/2010 | Yoo .................. 349/152 |
| 2010/0118221 A1* | 5/2010 | Kim et al. .................. 349/39 |
| 2010/0208162 A1* | 8/2010 | Lee .................. 349/58 |

FOREIGN PATENT DOCUMENTS

| JP | 2001133757 A | | 5/2001 |
| JP | 2001-194645 A | * | 7/2001 |
| JP | 2001194645 A | | 7/2001 |
| JP | 2002350850 A | | 12/2002 |
| JP | 2005099619 A | | 4/2005 |
| KR | 10-2006-0076591 A | * | 7/2006 |
| KR | 10-2008-0041089 A | * | 5/2008 |
| WO | 2004023199 A1 | | 3/2004 |

OTHER PUBLICATIONS

Search Report issued by the EPO on Oct. 5, 2009 during the examination of the corresponding European Patent Application. (No. 09008027.6).
EP Search Report, May 30, 2011.
European Office Action issued on Dec. 15, 2011.

* cited by examiner

*Primary Examiner* — Mike Stahl
(74) *Attorney, Agent, or Firm* — Cantor Colburn LLP (57) ABSTRACT

A liquid crystal display includes a liquid crystal panel including short sides and long sides, a plurality of gate lines disposed on the liquid crystal panel and extending substantially in parallel with the short sides of the liquid crystal panel, a plurality of data lines insulated from the gate lines, intersecting the gate lines and extending substantially in parallel with the long sides of the liquid crystal panel, a printed circuit board disposed near one of the short sides of the liquid crystal panel and providing an image signal to the liquid crystal panel, a light guide plate overlapping the liquid crystal panel, a light source module providing light to the light guide plate and a circuit board on which the light source module is mounted.

34 Claims, 12 Drawing Sheets

LIQUID CRYSTAL DISPLAY

This application claims priority to Korean Patent Application No. 10-2008-0119142 filed on Nov. 27, 2008, and all the benefits accruing therefrom under 35 U.S.C. §119, the disclosure of which is incorporated herein by reference in its entirety.

BACKGROUND OF THE INVENTION

1. Field of the Invention

The present invention relates to a liquid crystal display ("LCD"), and more particularly, to an LCD which can reduce the manufacturing cost thereof.

2. Description of the Related Art

Liquid crystal displays ("LCDs") include a first display panel including a plurality of pixel electrodes, a second display panel including a common electrode, and a liquid crystal panel including a dielectric-anisotropy liquid crystal layer interposed between the first and second display panels. An LCD may display desired images by generating an electric field between the plurality of pixel electrodes and the common electrode, and adjusting the intensity of the electric field so as to control the amount of light transmitted through the liquid crystal panel.

In a conventional LCD, the manufacturing cost of a data driving module is generally higher than that of a gate driving module, and a transistor of the data driving module is required to provide high mobility.

BRIEF SUMMARY OF THE INVENTION

Since the manufacturing cost of a data driving module is generally higher than that of a gate driving module, and a transistor of the data driving module is required to provide high mobility to a liquid crystal display ("LCD"), there may be disadvantages in manufacturing the liquid crystal display. For example, it is difficult to directly form the data driving module on an insulating substrate as an integrated circuit ("IC"). In addition, as the number of data lines connected to each data driving module increases, the number of data driving modules required to manufacture an LCD increases, and thus, the manufacturing cost increases considerably. Therefore, in order to reduce the manufacturing cost, an LCD capable of reducing the number of data driving modules and/or the number of data lines is needed. Exemplary embodiments of the present invention provide a liquid crystal display ("LCD") which can reduce the manufacturing cost.

In an exemplary embodiment, there is provided an LCD including a liquid crystal panel including short sides and long sides, a plurality of gate lines disposed on the liquid crystal panel and extending in parallel with the short sides, a plurality of data lines insulated from the gate lines, intersecting the gate lines and extending in parallel with the long sides, a printed circuit board ("PCB") disposed near one of the short sides and providing an image signal to the liquid crystal panel, a light guide plate overlapping the liquid crystal panel, a light source module providing light to the light guide plate, and a circuit board on which the light source module is mounted.

In an exemplary embodiment, there is provided an LCD including a liquid crystal panel including short sides and long sides, a plurality of gate lines disposed on the liquid crystal panel and extending in parallel with the short sides, a gate driving module connected to the gate lines, disposed on the liquid crystal panel as an IC and disposed along one of the long sides, a plurality of data lines insulated from the gate lines, intersecting the gate lines and extending in parallel with the long sides, a data driving module connected to the data lines and disposed near one of the short sides, and a PCB disposed near one of the short sides and providing an image signal to the liquid crystal panel.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art.

It will be understood that when an element is referred to as being "on," "connected" or "coupled" to another element, it can be directly connected or coupled to the other element or intervening elements may be present. In contrast, when an element is referred to as being "directly connected" or "directly coupled" to another element, there are no intervening elements present. Like numbers refer to like elements throughout. As used herein the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, relative terms such as "below," "lower," "above," and "upper" may be used herein to describe one element's relationship to another element as illustrated in the accompanying drawings. It will be understood that relative terms are intended to encompass different orientations of the device in addition to the orientation depicted in the accompanying drawings. For example, if the device in the accompanying drawings is turned over, elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the exemplary terms "below" and "lower" can, therefore, encompass both an orientation of above and below.

Hereinafter, the present invention will be described in detail with reference to the accompanying drawings.

A liquid crystal display ("LCD") according to an exemplary embodiment of the present invention will hereinafter be described in detail with reference to FIGS. 1 through 4C.

Figure 1:
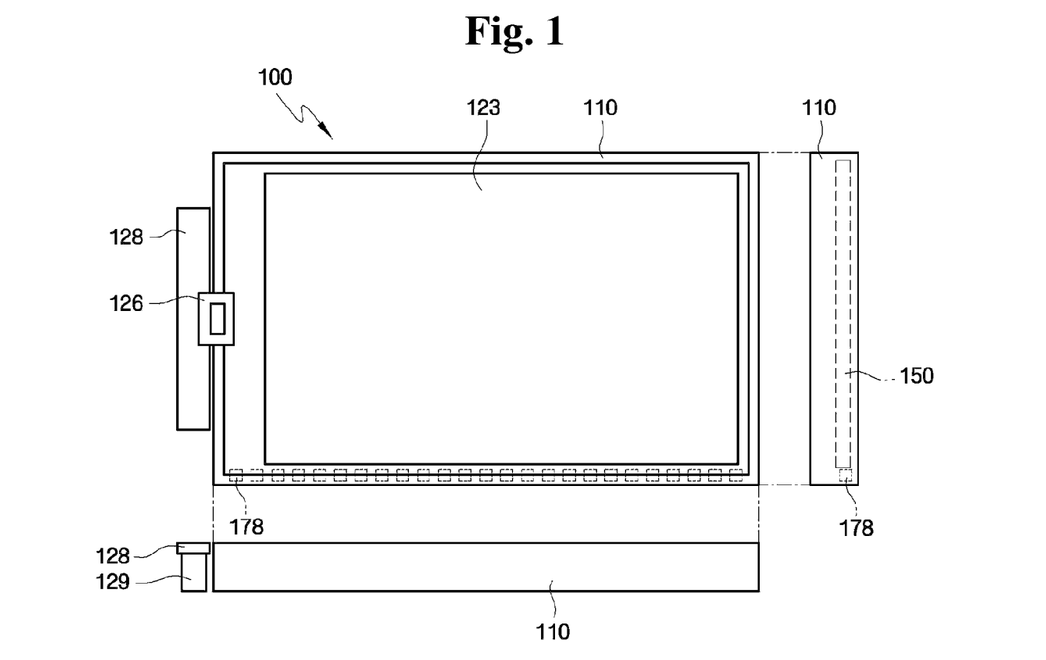
FIG. 1 illustrates a front view and side views of a liquid crystal display ("LCD") according to a first exemplary embodiment of the present invention.
Figure 2:
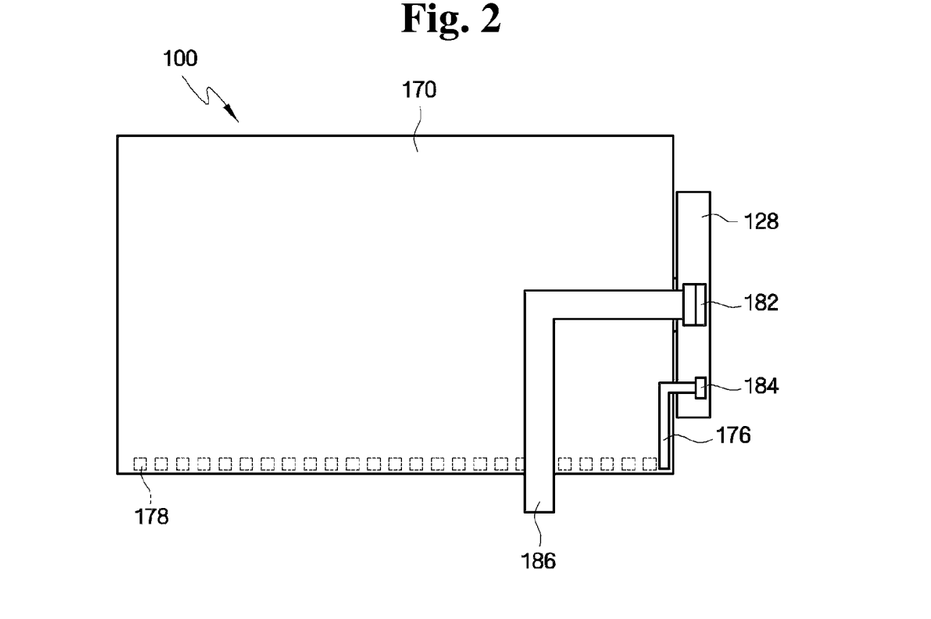
FIG. 2 illustrates an exemplary embodiment of a rear view of the LCD shown in FIG. 1.
Figure 3:
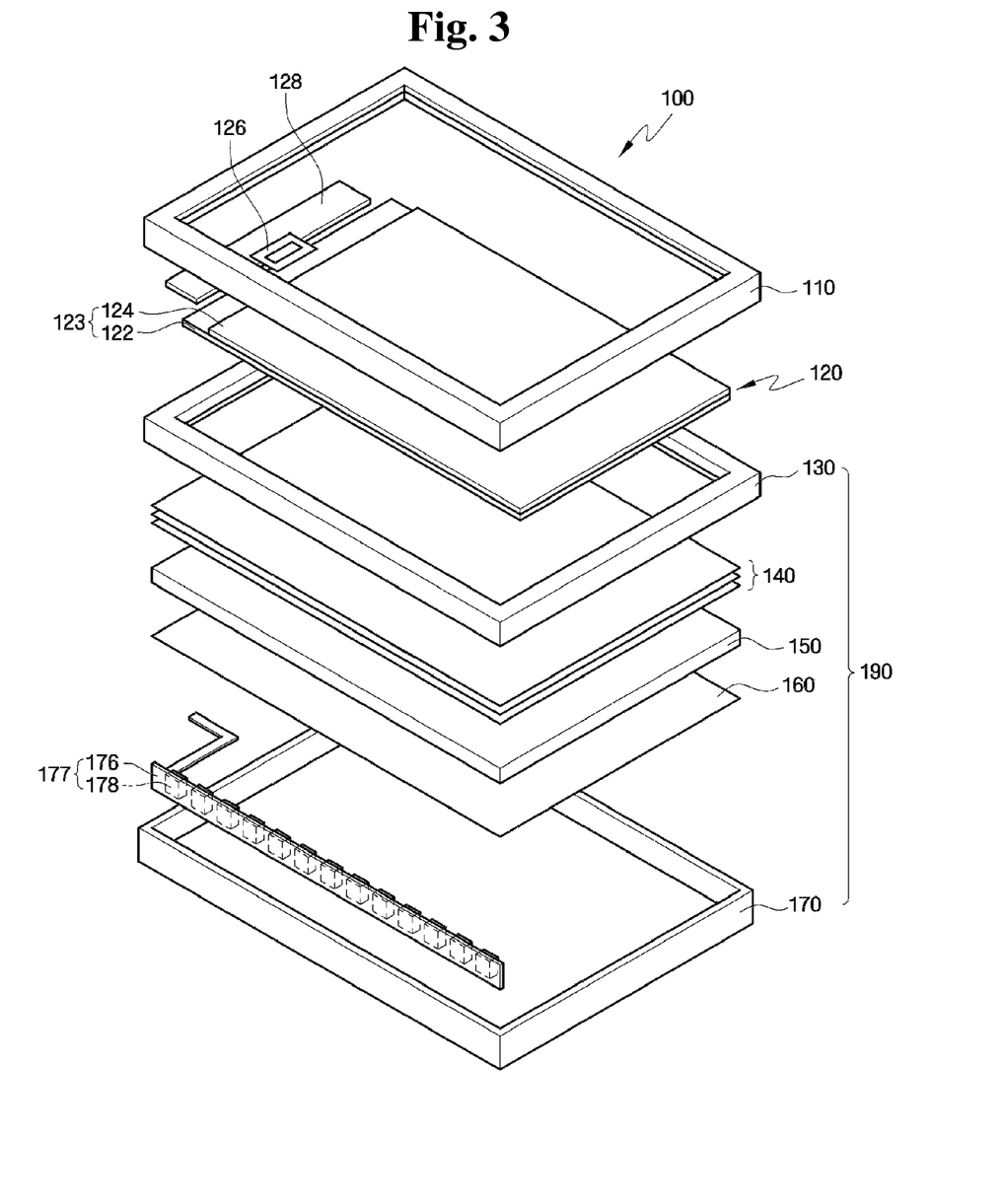
FIG. 3 illustrates an exploded perspective view of the LCD shown in FIG. 1.

FIG. 1 illustrates a front view and side views of an LCD 100 according to a first exemplary embodiment of the present invention, FIG. 2 illustrates an exemplary embodiment of a rear view of the LCD 100, and FIG. 3 illustrates an exploded perspective view of the LCD 100.

Referring to FIGS. 1 through 3, the LCD 100 may include a liquid crystal panel assembly 120, a backlight assembly 190 and an upper container 110.

The liquid crystal panel assembly 120 may include a liquid crystal panel 123, a chip film package 126 and a printed circuit board ("PCB") 128.

The liquid crystal panel 123 may include a lower display panel 122 including a plurality of gate lines, a plurality of data lines, a thin-film transistor ("TFT") array and a plurality of pixel electrodes, an upper display panel 124 facing the lower display panel 122, and a liquid crystal layer (not shown) interposed between the lower display panel 122 and the upper display panel 124.

The liquid crystal panel 123 may be substantially rectangular in planar shape, and may display image data. In a layout view, the gate lines may extend substantially vertically in a first direction and substantially parallel with the short (e.g., transverse) sides of the liquid crystal panel 123. In the layout view, the data lines may extend substantially horizontally in a second direction and substantially parallel with the long (e.g., longitudinal) sides of the liquid crystal panel 123. The first and the direction may be inclined relative to each other, such as being substantially perpendicular to each other. The short sides of the liquid crystal panel 123 may correspond to the left and right sides of a viewing direction from which a viewer watches the LCD 100, and the long sides of the liquid crystal panel 123 may correspond to the upper and lower sides of the viewing direction. However, the present invention is not restricted thereto.

The chip film package 126 may be a data driving module. The chip film package 126 may be disposed on a first side (e.g., the left side or transverse side) of the liquid crystal panel 123, may be connected to the data lines disposed on the lower display panel 122, and may provide a data driving signal to the data lines. The chip film package 126 may include a wiring pattern obtained by disposing a semiconductor chip on a flexible film and a tape-automated bonding ("TAB") tape. In one exemplary embodiment, a tape carrier package ("TCP") or a chip-on-film ("COF") may be used as the chip film package 126, but the present invention is not restricted thereto.

A gate driving module (not shown) may be connected to the gate lines disposed on the lower display panel 122 and may provide a gate driving signal to the gate lines. The gate driving module may be disposed on the lower display panel 122 as an integrated circuit. In one exemplary embodiment, the gate driving module may be disposed on the upper or lower side of the lower display panel 122, in the layout view, such as to be disposed at a side of the liquid crystal panel 123 adjacent to the side where the chip film package 126 is disposed. The gate driving module may be formed during the formation of a TFT array. However, the present invention is not restricted thereto. In an exemplary embodiment, the gate driving module may be formed in substantially the same shape as the chip film package 126.

Since the chip film package 126 is disposed near one of the short sides of the liquid crystal panel 123 so as to be connected to the data lines of the liquid crystal panel 123, the PCB 128, which is connected to the chip film package 126, may also be disposed near whichever of the short sides of the liquid crystal panel 123 is close to the chip film package 126. Various driving elements 129 for processing a gate driving signal to be input to the gate driving module and a data driving signal to be input to the chip film package 126 may be mounted on the PCB 128. The PCB 128 may be connected to the liquid crystal panel 123 and may provide image data to the liquid crystal panel 123.

In order to minimize an overall thickness of the LCD 100, the PCB 128 may be disposed on a level with the liquid crystal panel 123. Referring to a side view of FIG. 1, an uppermost surface of the PCB 128 is substantially coplanar with an uppermost surface of the upper container 110 of the LCD 100. Similarly, a lowermost surface of the driving element 129 is disposed substantially coplanar with and not extending further than a lowermost surface of the upper container 110 of the LCD 100.

Referring to FIG. 2, the PCB 128 may be connected to an external controller (not shown) through a film module 186, and may be provided with various signals for displaying an image by the external controller. In the illustrated embodiment, a first connector 182 may be disposed on a bottom surface of the PCB 128, and may be electrically and physically connected to the film module 186. In order to reduce an overall size (e.g., dimension) of the LCD 100, a width of the PCB 128, taken in a direction substantially perpendicular to a longitudinal direction of the PCB 128, may be reduced. In the illustrated embodiment, if a width of the film module 186, taken in a direction substantially perpendicular to a longitudinal direction of the film module 186, is greater than the width of the PCB 128, a connection terminal of the first connector 182 may be arranged to face the liquid crystal panel 123. As shown in FIG. 2, the film module 186 may be coupled to the first connector 182 by being moved in a direction substantially perpendicular to the short sides of the liquid crystal panel 123. The film module 186 may be bent in an L-shape in the layout view.

The backlight assembly 190 may include a mold frame 130, a plurality of an optical sheet 140, a light guide plate 150, a reflective sheet 160, a light source module 177 and a lower container 170.

The light guide plate 150 may guide light provided to the liquid crystal panel 123 by the light source module 177. The light guide plate 150 may be substantially plate-shaped (e.g., planar) and include a transparent plastic material, and may be able to efficiently transmit light. In one exemplary embodiment, the light guide plate 150 may include of an acrylic resin, such as polymethyl methacrylate ("PMMA") or polycarbonate. When light incident upon one or more of a side surface of the light guide plate 150 arrives at the top or bottom of the light guide plate 150 at an angle greater than the critical angle of the light guide plate 150 by passing through the light guide plate 150, the light is essentially totally reflected from the respective top or bottom of the light guide plate 150, and is uniformly distributed throughout the whole light guide plate 150, instead of being emitted from the light guide plate 150. As used herein, top and bottom may refer to a front or viewing side of the LCD 100, and a rear side of the LCD 100, respectively.

A plurality of diffusion patterns (not shown) may be disposed on at least one of the top or bottom of the light guide plate 150 in order to emit light reflected within the light guide plate 150 toward the liquid crystal panel 123, which is disposed above the light guide plate 150 towards the viewing side of the LCD 100. In one exemplary embodiment, the diffusion patterns may be disposed on the bottom of the light guide plate 150. Light reflected within the light guide plate 150 may be reflected by the diffusion patterns and may be emitted toward the outside of the light guide plate 150 through the top surface (e.g., light emitting surface) of the light guide plate 150.

In order to substantially uniformly maintain the luminance of light emitted from the light guide plate 150, the size and/or density of the diffusion patterns may vary according to the distance from the light source module 177. In one exemplary embodiment, the size and/or density of the diffusion patterns may increase as the distance from the light source module 177 increases, thereby substantially uniformly maintaining the luminance of light emitted from the light guide plate 150. The diffusion patterns may be formed using a silk-screen printing method, but the present invention is not restricted thereto. In an alternative embodiment, a plurality of grooves or protrusions may be disposed on the light guide plate 150, thereby obtaining the benefits of the diffusion patterns.

The light source module 177 may be disposed on one or more of a side of the light guide plate 150. In the layout view of FIGS. 1 and 2, the light source module 177 may be disposed below the light guide plate, and particularly, along a lower side of the LCD 100 which is a longitudinal side of the LCD 100. In the side view of FIG. 1, the light source module 177 is disposed at a side of the light guide plate 150. In the illustrated embodiment, the light guide plate 150 may be formed as a substantially flat plate having a substantially uniform thickness in order to uniformly distribute light throughout an entire display screen, but the present invention is not restricted thereto. Alternatively, the light guide plate 150 may be formed in various shapes other than that set forth herein. The light source module 177 may include a circuit board 176 on which circuit patterns are disposed, and a plurality of a light source unit 178 each of which is mounted on the circuit board 176. The light source units 178 generate light to be provided to the light guide plate 150.

Each of the light source units 178 may include a light-emitting element. In exemplary embodiments, light-emitting diodes ("LEDs"), incandescent bulbs, or white halogen lamps may be used as the light source units 178. Preferably, LEDs, which have excellent color representation capability and consume less power, may be used as the light source units 178. Each of the light source units 178 may include a frame (not shown), and red, green and blue light-emitting chips (not shown) installed in the frame. Red light, green light and blue light emitted from the red, green and blue light-emitting chips, respectively, may be mixed, thereby generating white light.

Referring to FIGS. 2 and 3, a first portion of the circuit board 176 may be disposed between the lower container 170 and the light guide plate 150, and the light source units 178 may be mounted on the first portion of the circuit board 176. A second portion of the circuit board 176 may extend from an inner portion of the lower container 170 to along an outer surface of a rear of the lower container 170 through an opening (not shown) disposed at a bottom portion of the lower container 170. An end of the circuit board 176 may be connected to the PCB 128 at the rear of LCD 100, as illustrated in FIG. 2. The end of the circuit board 176 may be connected to a second connector 184 disposed on a bottom of the PCB 128. A connection terminal of the second connector 184, like the connection terminal of the first connector 182, may be arranged to face the liquid crystal panel 123. In the illustrated embodiment, the circuit board 176 may be coupled to the second connector 184 by being moved in a direction substantially perpendicular to the short sides of the liquid crystal panel 123. An entire of the circuit board 176 disposed at the rear of the LCD 100 overlaps portions of the lower container 170 and the PCB 128.

If the circuit board 176 of the light source module 177 and the film module 186 overlap each other, signal interference may occur. In the illustrated embodiment, the second connector 184 may be disposed closer to the light source module 177 than the first connector 182 to the light source module 177, in order to reduce or effectively prevent the circuit board 176 and the film module 186 from overlapping each other. The circuit board 176 and the film module 186 do not overlap each other at the rear side of the LCD 100. Therefore, the second connector 184 may be located lower than the first connector 182 on the PCB 128, as shown in the layout view of FIG. 2.

Referring again to FIG. 3, the optical sheets 140 may be disposed above the light guide plate 150 on a viewing side of the LCD 100. The optical sheets 140 may diffuse and collect light transmitted by the light guide plate 150. In an exemplary embodiment, the optical sheets 140 may include a diffusion sheet, one or more prism sheets and/or a protective sheet. The diffusion sheet may be disposed between the light guide plate 150 and the prism sheet and may diffuse light incident thereupon from the light guide plate 150, thereby reducing or effectively preventing the light from being concentrated in certain areas. A plurality of triangular prisms may be substantially uniformly disposed on the top of each of the prism sheets. More specifically, the optical sheets 140 may include two prism sheets. Where the optical sheets 140 include more than one prism sheet, the direction in which a plurality of prisms are arranged on one prism sheet may form a predetermined angle with the direction in which a plurality of prisms are arranged on another of the prism sheets. The prism sheets may collect light diffused by the diffusion sheet and may enable the collected light to be substantially perpendicularly incident upon the liquid crystal panel 123. Therefore, light transmitted through the prism sheets may travel substantially perpendicularly toward the liquid crystal panel 123, and the distribution of luminance on the protective sheet may become regular. The protective sheet may be disposed on the prism sheets, such as directly adjacent to the liquid crystal panel assembly 120, and may protect the prism sheets. In addition, the protective sheet may diffuse light and may provide a uniform distribution of light. The elements of the optical sheets 140 are not restricted to that set forth herein. The elements of the optical sheets 140 may change according to the structure of the LCD 100.

The reflective sheet 160 may be disposed below the light guide plate 150 towards the rear of the LCD 100, and may reflect light emitted from the bottom of the light guide plate 150 toward the light guide plate 150. The reflective sheet 160 may reflect light yet to be reflected by the diffusion patterns on the light guide plate 150 toward the light guide plate 150, thereby reducing light loss and improving the uniformity of light penetrated into the light guide plate 150. In an exemplary embodiment, the reflective sheet 160 may include polyethylene terephthalate ("PET"). One or more of a surface of the reflective sheet 160 may be coated with a diffusion layer, such as including titanium dioxide. In one exemplary embodiment, if titanium dioxide is dried and fixed onto the reflective sheet 160, a frost-like white layer may be formed on the reflective sheet 160, such that the reflective sheet 160 may be able to uniformly distribute light and effectively reflect light.

The mold frame 130 may be formed as a substantially rectangular frame and may be disposed to surround all sides of the optical sheets 140. The mold frame 130 may include sidewalls each connected to each other and disposed adjacent to side faces of the optical sheets 140, such that an uppermost surface of the optical sheets 140 is exposed to the liquid crystal panel assembly 120. The mold frame 130 may be coupled to the lower container 170 and may accommodate the optical sheets 140, the light guide plate 150, the reflective sheet 160 and the light source module 177 therein. The mold frame 130 and the upper container 170 may be coupled to each other in various manners, such as by using hooks or screws.

The liquid crystal panel 123 may be disposed above the mold frame 130 towards a viewing side of the LCD 100. The upper container 110 may be coupled to the lower container 170 or the mold frame 130 so as to cover (e.g., overlap) upper top edges of the liquid crystal panel 123. The upper container 110 may include an upper face disposed continuous with sidewalls extending towards the rear of the LCD 100, such that an uppermost surface of the liquid crystal panel assembly 120 is exposed to the viewing side of the LCD 100.

Figure 4A:
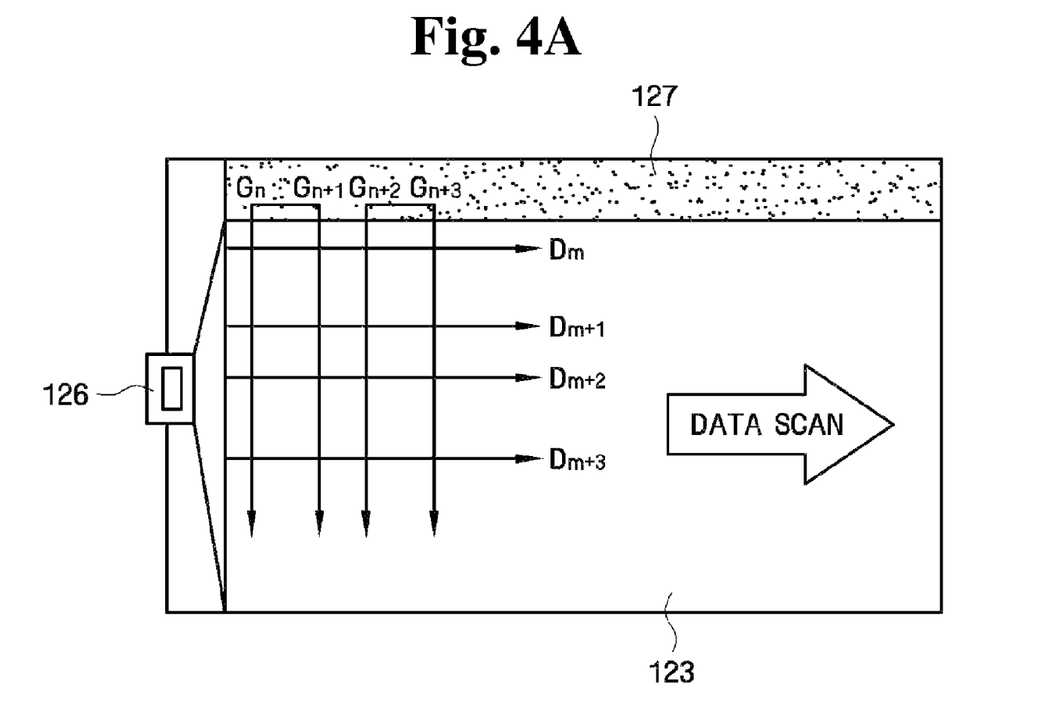
FIG. 4A illustrates a plan view of an exemplary embodiment of a liquid crystal panel shown in FIG. 3.

The structure of the liquid crystal panel 123 will hereinafter be described in detail with reference to FIGS. 4A through 4C. FIG. 4A illustrates a plan view of any exemplary embodiment of the liquid crystal panel 123, FIG. 4B illustrates a layout of an exemplary embodiment of a pixel array of the liquid crystal panel 123, and FIG. 4C illustrates an exemplary embodiment of an equivalent circuit diagram of the pixel array shown in FIG. 4B.

Figure 4B:
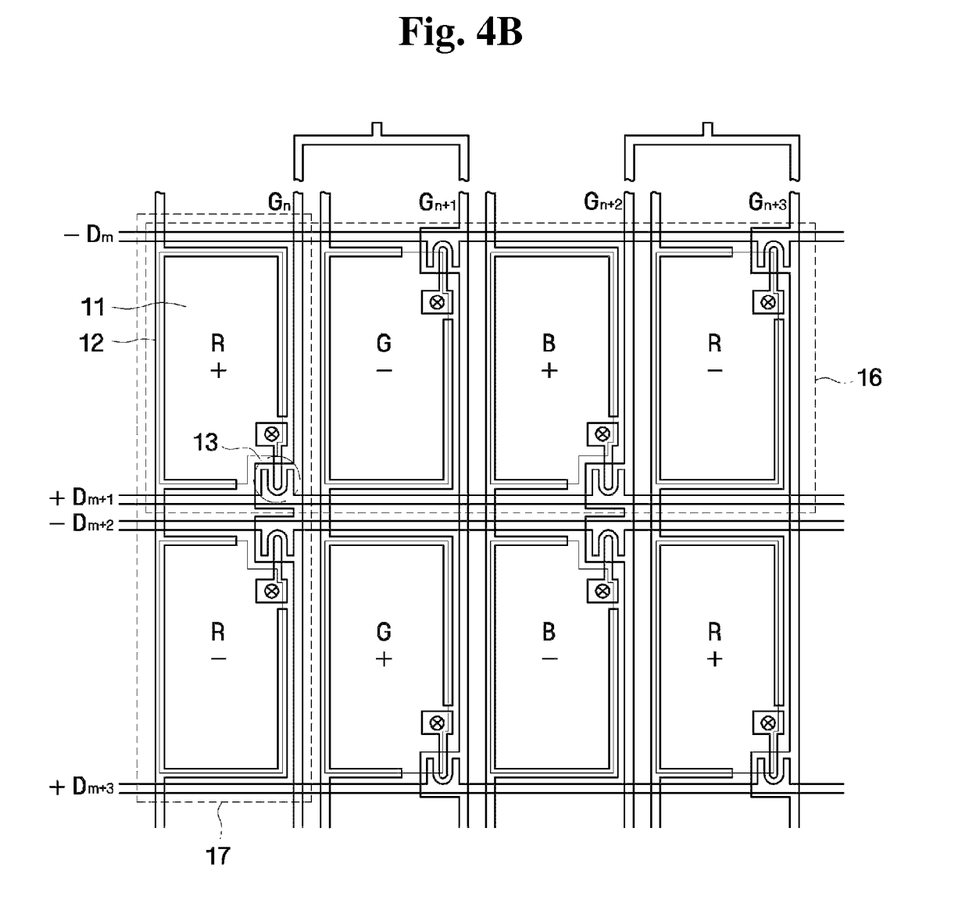
FIG. 4B illustrates a layout of an exemplary embodiment of a pixel array of the liquid crystal panel shown in FIG. 4A.
Figure 4C:
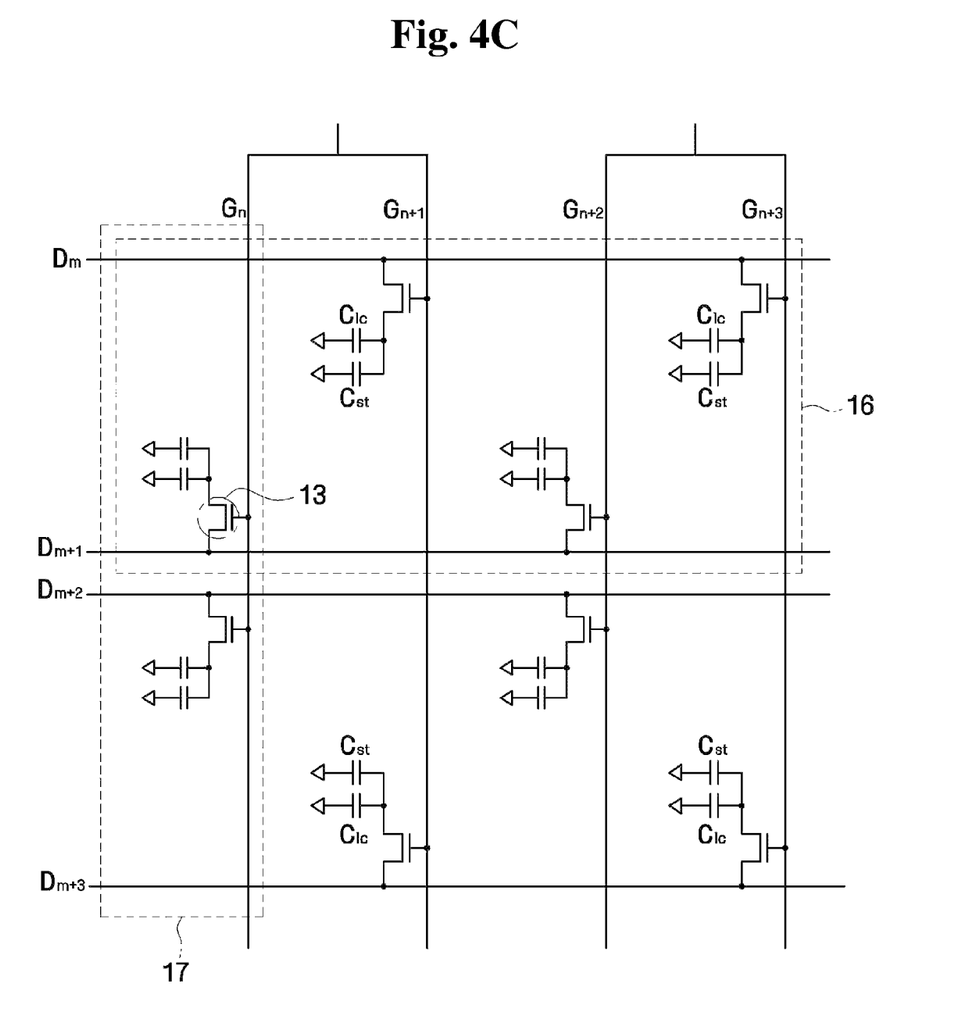
FIG. 4C illustrates an exemplary embodiment of an equivalent circuit diagram of the pixel array shown in FIG. 4B.

Referring to FIGS. 4A through 4C, the liquid crystal panel 123 may include a plurality of gate lines $G_n$ through $G_{n+3}$, a plurality of data lines $D_m$ through $D_{m+3}$, a plurality of pixel electrodes 11, a plurality of storage electrodes 12, a plurality of TFTs 13, the chip film package 126 (e.g., a data driving module) and a gate driving module 127.

Since the data lines $D_m$ through $D_{m+3}$ extend substantially horizontally in the layout view and in parallel with the long sides of the liquid crystal panel 123, the number of channels of the data driving module 126 can be reduced to two-thirds (⅔), compared with a conventional pixel design method in which data lines extend vertically and in parallel with short sides of a liquid crystal panel. With the number of the number of channels of the data driving module 126 can be reduced to two-thirds (⅔), it is possible to advantageously reduce the manufacturing cost of an LCD. In addition, since the gate driving module 127 is disposed on an insulating substrate (not shown) as an integrated circuit ("IC") during the fabrication of a TFT array, a gate driver IC may be unnecessary, and omitted from the structure of the liquid crystal panel 123.

Referring to FIGS. 4B and 4C, two adjacent data lines may be disposed for each of a plurality of a pixel row 16, and one gate line may be disposed for each of a plurality of a pixel column 17. The gate lines $G_n$ and $G_{n+1}$ may be electrically connected to each other, and the gate lines $G_{n+1}$ and $G_{n+2}$ may be electrically connected to each other. In the layout view, the TFTs 13 may be arranged in a zigzag fashion, and may be physically and electrically connected to the data lines $D_m$ through $D_{m+3}$ and the gate lines $G_n$ through $G_{n+3}$. In the illustrated embodiment, TFTs 13 disposed in adjacent areas along each of the pixel rows 16, are alternately directly connected to the two adjacent data lines to form the zigzag arrangement.

Since a gate signal is applied to a pair of horizontally adjacent pixels at the same time, it is possible to secure sufficient pixel charging time. The liquid crystal panel 123 may include a pixel array in which a plurality of pixels are arranged in a matrix, and each of the pixels may extend longer vertically than horizontally in the layout view. The pixel array may include the pixel rows 16 and the pixel columns 17. A number of pixels vertically adjacent to one another may represent the same color. Three pixels respectively representing red, green and blue may be alternately arranged in a longitudinal direction of each of the pixel rows 16.

The storage electrodes 12 may be substantially disposed near the gate lines $G_n$ through $G_{n+3}$ in order to prevent texture from being generated due to the distortion of an electric field when a gate signal is applied to the gate lines $G_n$ through $G_{n+3}$.

In the exemplary embodiment of FIGS. 4A through 4C, two data lines are disposed for each of the pixel rows 16, and one gate line is disposed for each of the pixel columns 17. However, the present invention is not restricted thereto. Alternatively, one data line may be disposed for each of the pixel rows 16, and one gate line may be disposed for each of the pixel columns 17. With one data line being disposed for each of the pixel rows 16, and one gate line being disposed for each of the pixel columns 17, the number of data lines, e.g., the number of channels of the data driving module 126, may be reduced to one-half (½), compared with the illustrated exemplary embodiment of FIGS. 4A through 4C. Advantageously, it is possible to reduce the manufacturing cost of an LCD and improve the aperture ratio of an LCD.

Figure 5A:
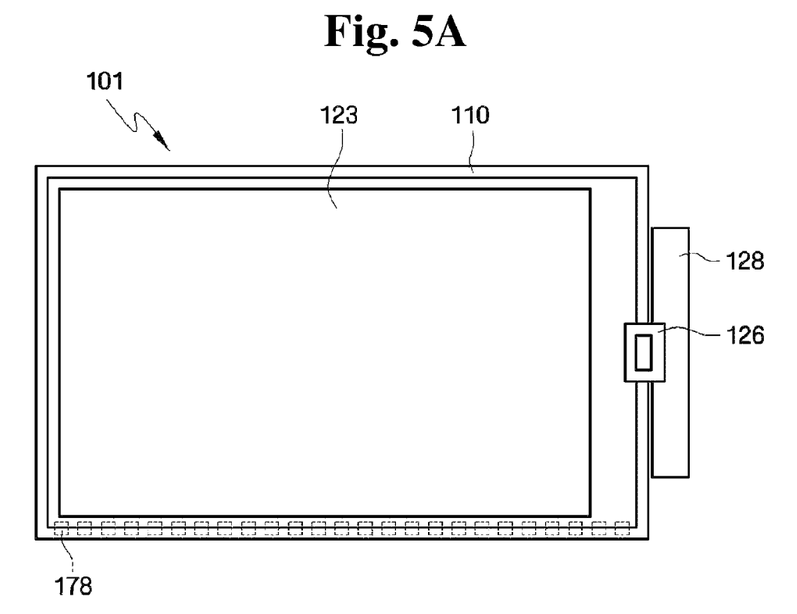
FIGS. 5A through 5C illustrate diagrams of alternative exemplary embodiments of the LCD shown in FIG. 1.
Figure 5B:
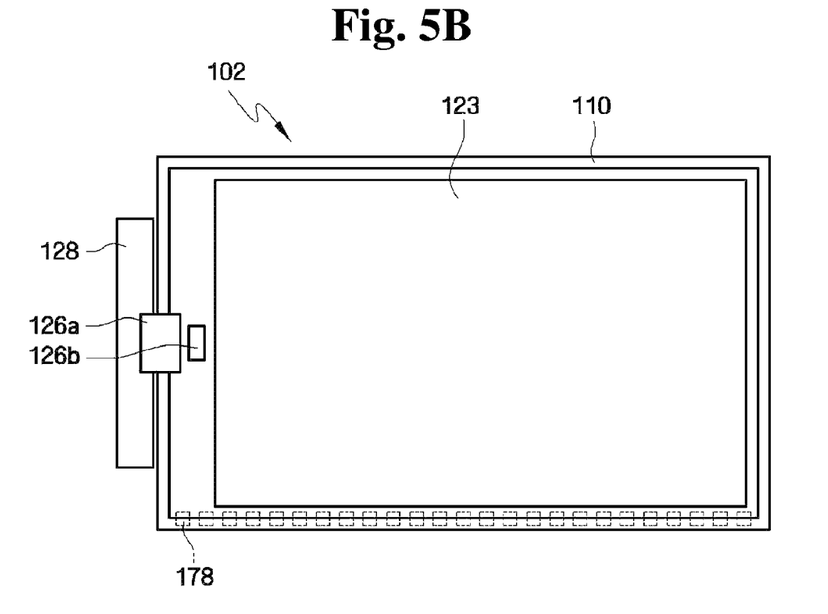
Figure 5C:
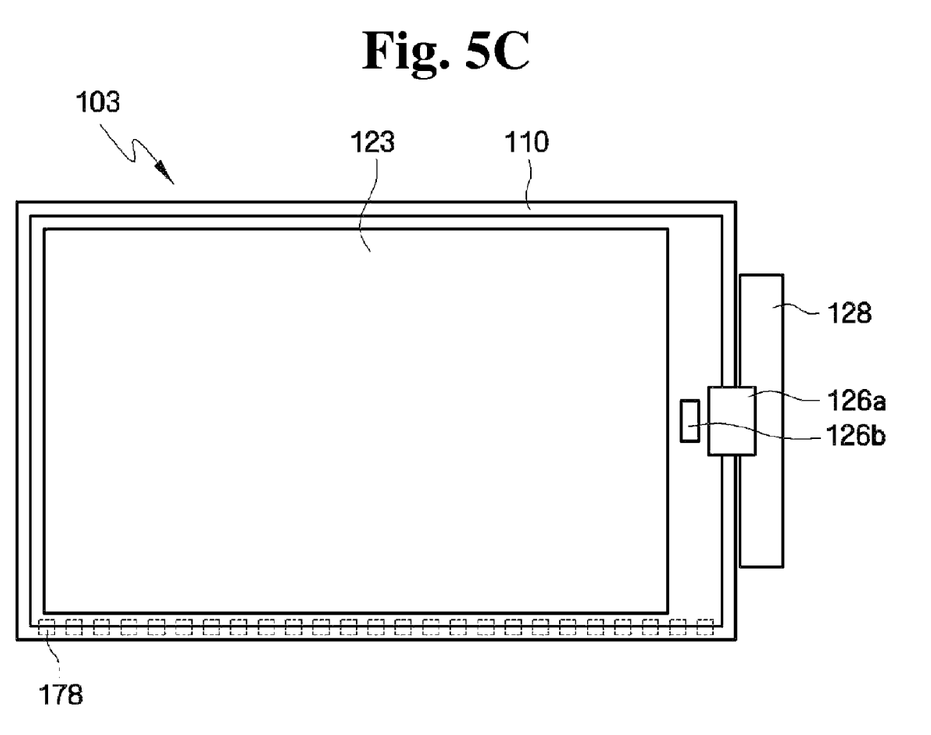

FIGS. 5A through 5C illustrate alternative exemplary embodiments of the LCD 100 shown in FIG. 1, e.g., LCDs 101 through 103.

Referring to the LCD 101 shown in FIG. 5A, a chip film package 126 may be disposed on the right transverse side of a liquid crystal panel 123, instead of on the left transverse side as illustrated in FIGS. 1-3.

Referring to the LCD 102 shown in FIG. 5B, a chip-on-glass ("COG") chip 126b may be mounted on a liquid crystal panel 123 as a data driving module, and the COG chip 126b and a PCB 128 may be electrically connected to each other by a circuit film 126a, which is disposed on the left transverse side of the liquid crystal panel 123. The circuit film 126a may electrically and physically connect the COG chip 126b and the PCB 128.

Referring to the LCD 103 shown in FIG. 5C, a PCB 128, a circuit film 126a and a COG chip 126b may all be disposed on the right transverse side of a liquid crystal panel 123, instead of on the left transverse side as illustrated in FIG. 5B. The circuit film 126a may electrically and physically connect the COG chip 126b and the PCB 128.

Figure 6:
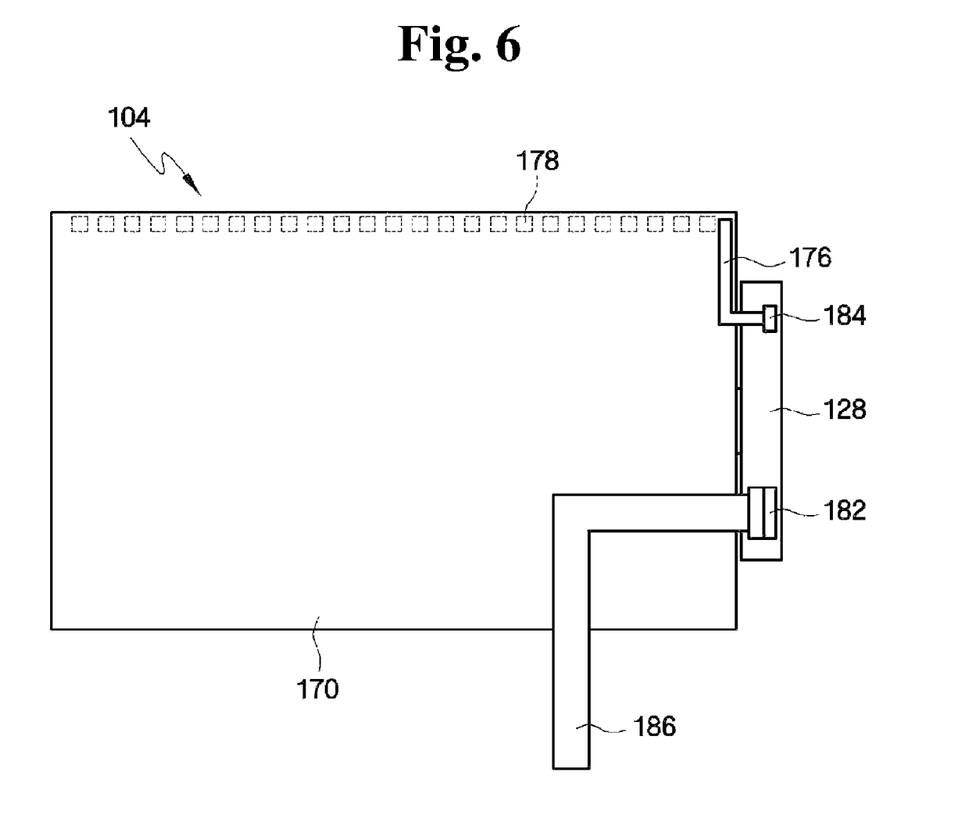
FIG. 6 illustrates a rear view of an LCD according to a second exemplary embodiment of the present invention.

An LCD according to another exemplary embodiment of the present invention will hereinafter be described in detail with reference to FIG. 6. FIG. 6 illustrates a bottom view of an LCD 104 according to a second exemplary embodiment of the present invention. In FIGS. 1 through 4C and 6, like reference numerals indicate like elements, and thus, detailed descriptions thereof will be omitted.

Referring to the layout view of FIG. 6, a plurality of light source units 178 may be disposed above a light guide plate (not shown) and may be arranged along the upper side of the LCD 104 which is a longitudinal side of the LCD 100. In order to prevent signal infiltration between a circuit board 176 and a film module 186, a second connector 184 may be disposed closer to the light source units 178 than a first connector 182 to the light source units 178. In the layout view, the second connector 184 may be located higher than the first connector 182 in the longitudinal direction of a PCB 128.

In the illustrated embodiment, the first connector 182 and the second connector 184 may each be disposed at an end of the PCB 128, in contrast to FIG. 2 where the first connector 182 is disposed at a substantially central portion of the PCB 128. Where the first connector 182 and the second connector 184 are each disposed at an end of the PCB 128, the circuit board 176 of the light source module 177 and the film module 186 are extended to opposing longitudinal sides of the LCD 104, where in FIG. 2, both the circuit board 176 and the film module 186 are extended to a same longitudinal side of the LCD 100.

Figure 7A:
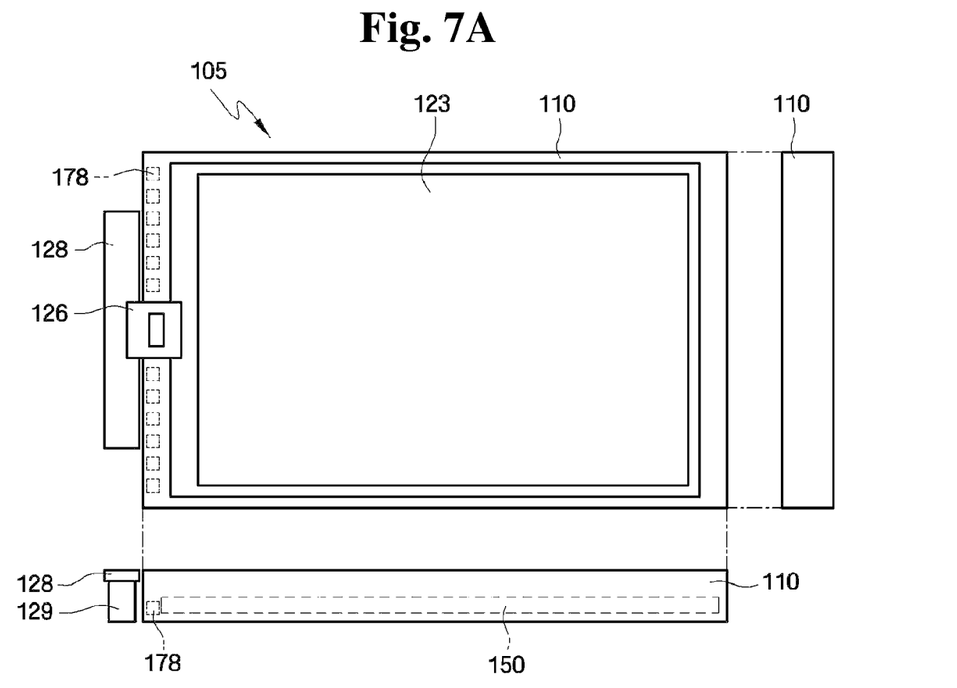
FIG. 7A illustrates a front view and side views of an LCD according to a third exemplary embodiment of the present invention.
Figure 7B:
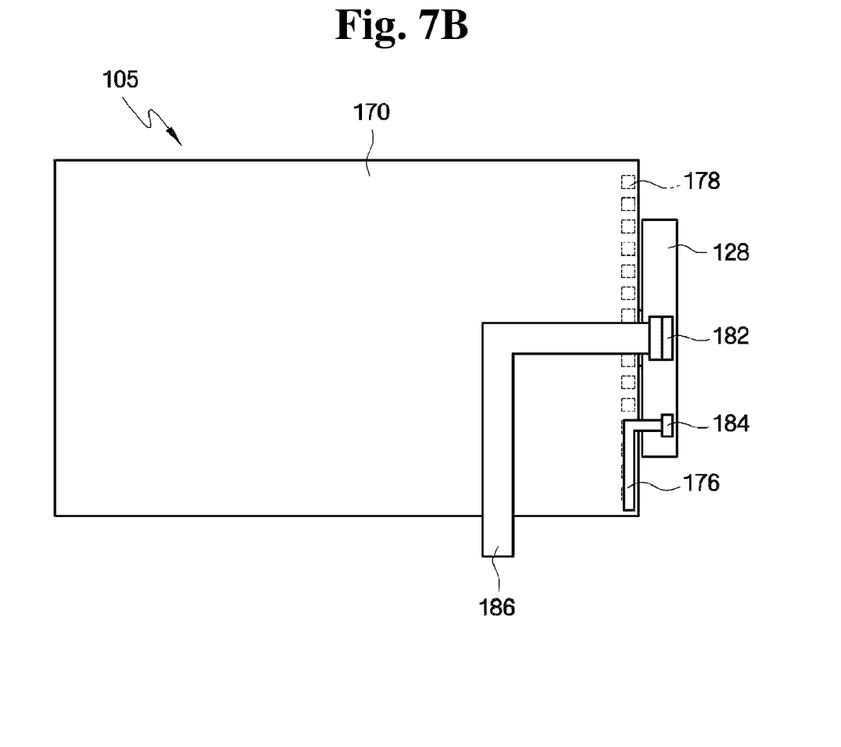
FIG. 7B illustrates an exemplary embodiment of a rear view of the LCD shown in FIG. 7A.

An LCD according to another exemplary embodiment of the present invention will hereinafter be described in detail with reference to FIGS. 7A and 7B. FIG. 7A illustrates a front view and a side views of an LCD 105 according to a third exemplary embodiment of the present invention, and FIG. 7B illustrates a rear view of the LCD 105. In FIGS. 1 through 4C, 7A, and 7B, like reference numerals indicate like elements, and thus, detailed descriptions thereof will be omitted.

Referring to FIGS. 7A and 7B, a chip film package 126 may be electrically and physically connected to a plurality of data lines (not shown), which are disposed on a liquid crystal panel 123, and extend substantially horizontally in the layout view, and a PCB 128 may be physically and electrically connected to the chip film package 126. The film package 126 and the PCB 128 may be disposed near one of the short transverse sides of the liquid crystal panel 123. A plurality of light source units 178 may be disposed between the PCB 128 and the liquid crystal panel 123 in the layout view. More specifically, the light source units 178 may be disposed on the left side of a light guide plate 150, and particularly, on the left transverse side of the LCD 105. In contrast, the plurality of light sources 178 are disposed substantially parallel to longitudinal sides of the LCD 100 in FIGS. 1-3.

If a circuit board 176 and a film module 186 overlap each other, signal interference may occur. In order to prevent signal interference between the circuit board 176 and the film module 186, the circuit board 176 and the film module 186 may be arranged so as not to overlap each other. In the illustrated embodiment, an end of the circuit board 176 and an end the film module 186 opposing the second connector 184 and the first connector 182 respectively, are both disposed extended toward a same longitudinal side of the LCD 105.

Figure 8A:
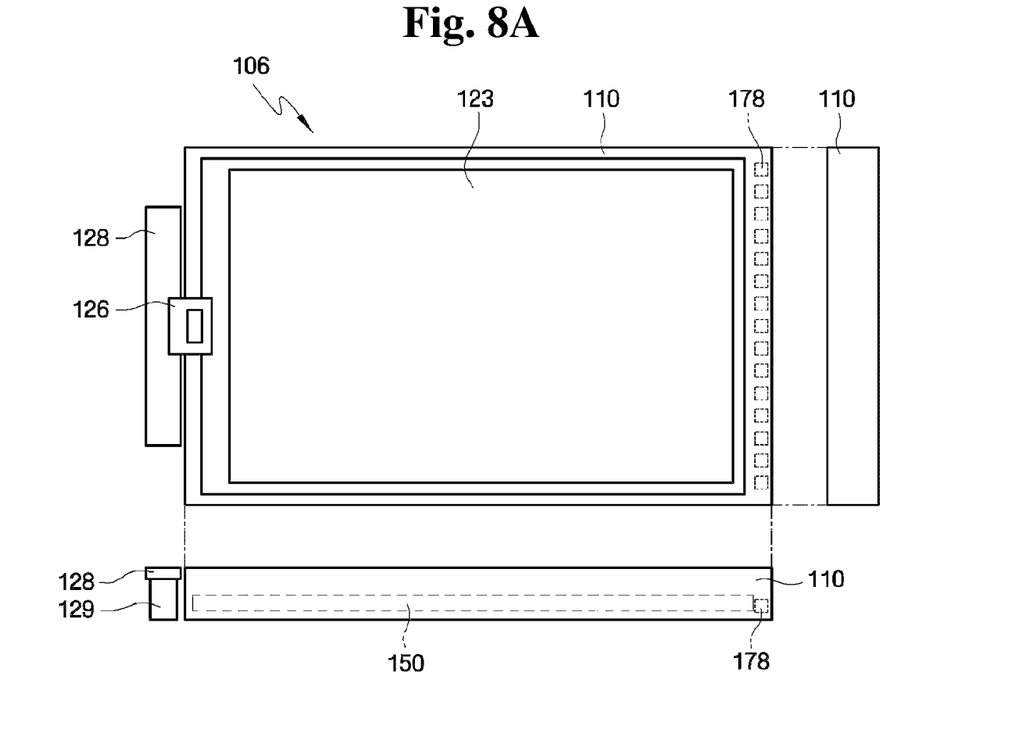
FIG. 8A illustrates a front view and side views of an LCD according to a fourth exemplary embodiment of the present invention.
Figure 8B:
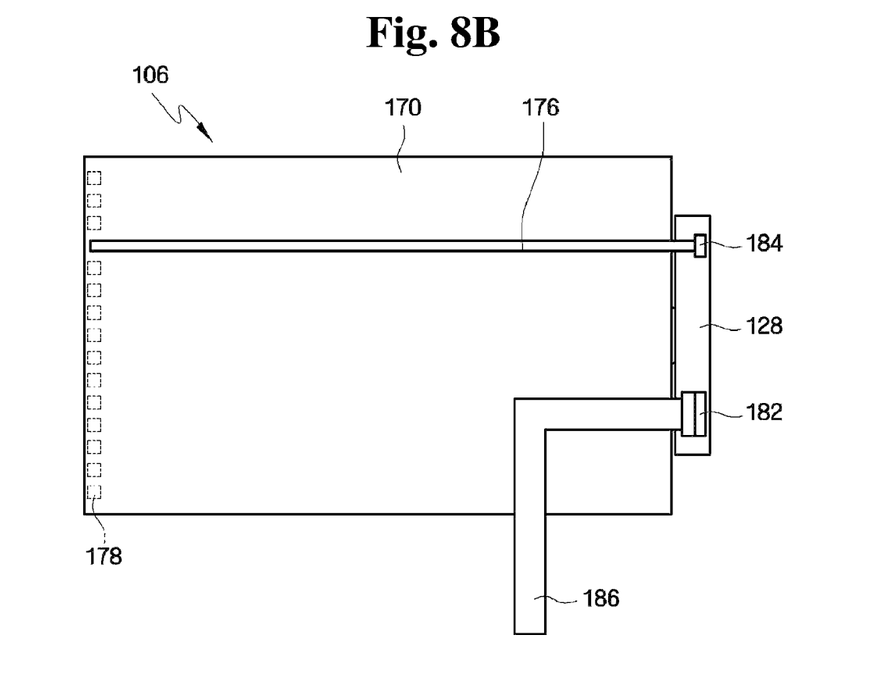
FIG. 8B illustrates an exemplary embodiment of a rear view of the LCD shown in FIG. 8A.

An LCD according to another exemplary embodiment of the present invention will hereinafter be described in detail with reference to FIGS. 8A and 8B. FIG. 8A illustrates a front view and side views of an LCD 106 according to a fourth exemplary embodiment of the present invention, and FIG. 8B illustrates a rear view of the LCD 106. In FIGS. 1 through 4C, 8A, and 8B, like reference numerals indicate like elements, and thus, detailed descriptions thereof will be omitted.

Referring to FIGS. 8A and 8B, a chip film package 126 may be physically and electrically connected to a plurality of data lines (not shown), which are disposed on a liquid crystal panel 123 and extend substantially horizontally in the layout view, and a PCB 128 may be physically and electrically connected to the chip film package 126. The chip film package 126 and the PCB 128 may be disposed near one of the short transverse sides of the liquid crystal panel 123.

A plurality of light source units 178 may be arranged along whichever of the short transverse sides of the liquid crystal panel is more distant than the other from the PCB 128. In the illustrated embodiment, the light source units 178 may be disposed on the right side of a light guide plate 150 in the layout view, and particularly, on the right side of the LCD 106.

If a circuit board 176 and a film module 186 overlap each other, signal interference may occur. In order to prevent signal interference between the circuit board 176 and the film module 186, the circuit board 176 and the film module 186 may be arranged so as not to overlap each other. The circuit board 176 may connect the PCB 128 and the light source units 178 by extending horizontally along the surface of the bottom of the LCD 106. A first end of the circuit board 176 and a first end of the film module 186 are connected to the second connector 184 and the first connector 182, respectively. A second end of each of the circuit board 176 and the film module 186 are respectively disposed extended to adjacent sides of the LCD 106, such as a longitudinal side and a transverse side adjacent to the longitudinal side.

Figure 9A:
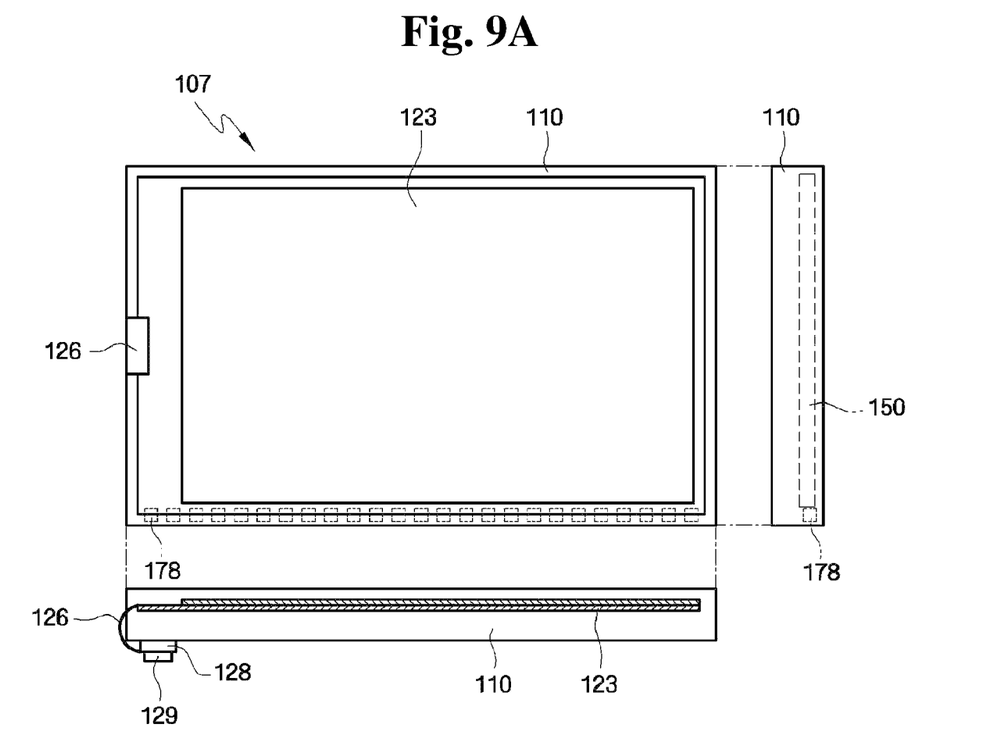
FIG. 9A illustrates a front view and side views of an LCD according to a fifth exemplary embodiment of the present invention.
Figure 9B:
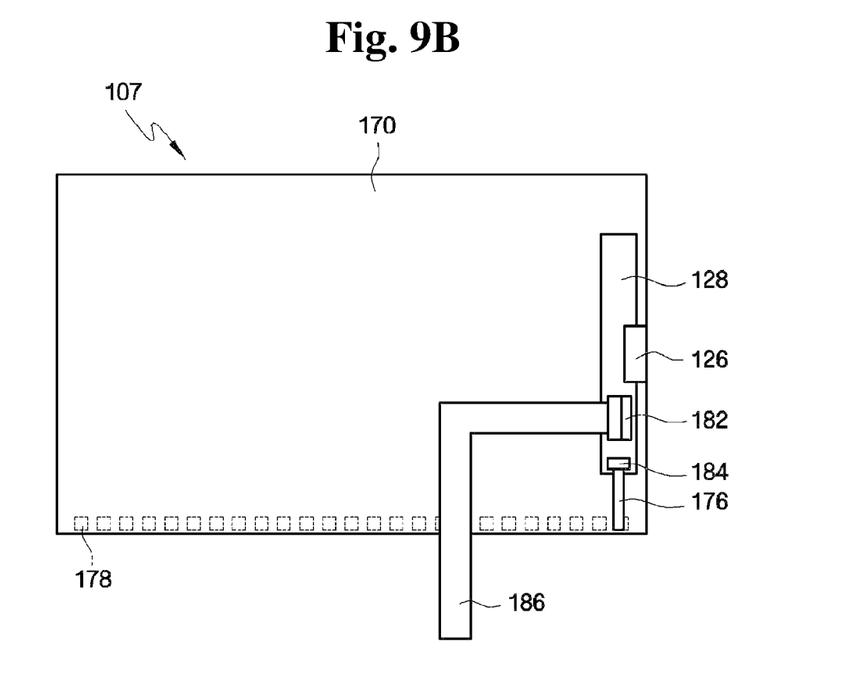
FIG. 9B illustrates an exemplary embodiment of a rear view of the LCD shown in FIG. 9A.

An LCD according to another exemplary embodiment of the present invention will hereinafter be described in detail with reference to FIGS. 9A and 9B. FIG. 9A illustrates a front view and side views of an LCD 107 according to a fifth exemplary embodiment of the present invention, and FIG. 9B illustrates a rear view of the LCD 107. In FIGS. 1 through 4C, 9A, and 9B, like reference numerals indicate like elements, and thus, detailed descriptions thereof will be omitted.

Referring to FIGS. 9A and 9B, a plurality of light source units 178 may be disposed below a light guide plate 150 in the layout view, and may be arranged along the lower longitudinal side of the LCD 107. A chip film package 126 may be physically and electrically connected to a plurality of data lines (not shown), which are disposed on a liquid crystal panel 123. The chip film package 126 may be disposed near one of the short transverse sides of the liquid crystal panel 123. Since a PCB 128 is connected to the liquid crystal panel 123 by the chip film package 126, which includes a flexible film, the PCB 128 may be bent along the short transverse side of the liquid crystal panel 123 and may be disposed at a rear of the liquid crystal panel 123.

If a circuit board 176 and a film module 186 overlap each other, signal interference may occur. In order to prevent signal interference between the circuit board 176 and the film module 186, the circuit board 176 and the film module 186 may be arranged so as not to overlap each other.

Figure 10A:
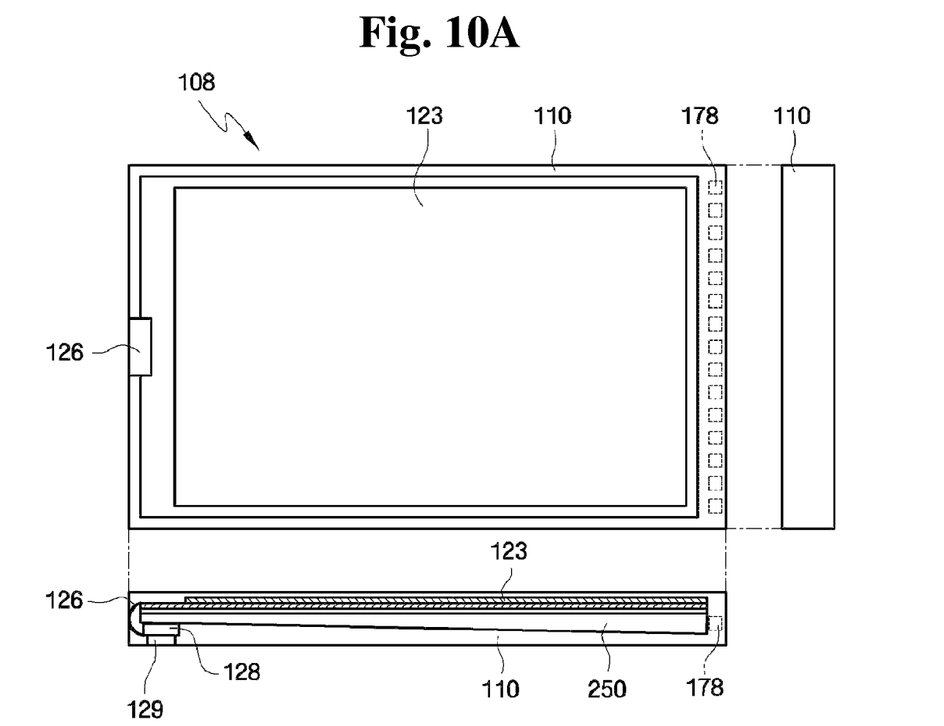
FIG. 10A illustrates a front view and side views of an LCD according to a sixth exemplary embodiment of the present invention.
Figure 10B:
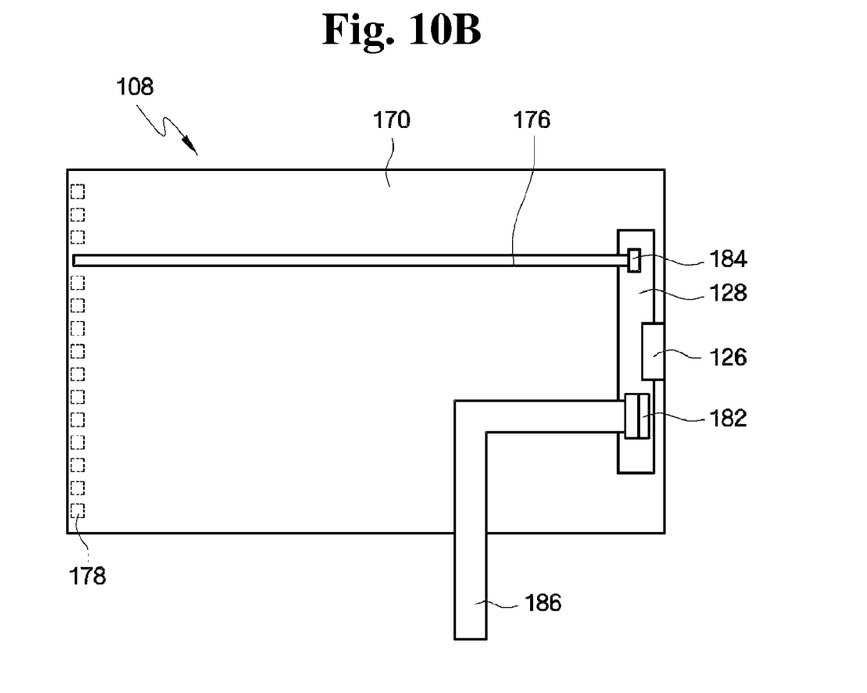
FIG. 10B illustrates an exemplary embodiment of a rear view of the LCD shown in FIG. 10A.

An LCD according to another exemplary embodiment of the present invention will hereinafter be described in detail with reference to FIGS. 10A and 10B. FIG. 10A illustrates a front view and side views of an LCD 108 according to a sixth exemplary embodiment of the present invention, and FIG. 10B illustrates a rear view of the LCD 108. In FIGS. 1 through 4C, 10A, and 10B, like reference numerals indicate like elements, and thus, detailed descriptions thereof will be omitted.

Referring to FIGS. 10A and 10B, a chip film package 126 may be physically and electrically connected to a plurality of data lines (not shown), which are disposed on a liquid crystal panel 123 and extend substantially horizontally in a longitudinal direction of the liquid crystal panel 123, and a PCB 128 may be physically and electrically connected to the chip film package 126. The film package 126 and the PCB 128 may be disposed near one of the short transverse sides of the liquid crystal panel 123. A plurality of light source units 178 may be arranged along whichever of the short transverse sides of the liquid crystal panel is more distant than the other from the PCB 128. In the illustrated embodiment, the light source units 178 may be disposed on the right side of a light guide plate 250 in the layout view, and particularly, on the right side of the LCD 108. Since the PCB 128 is connected to the liquid crystal panel 123 by the chip film package, which includes a flexible film, the PCB 128 may be bent along the transverse side of the liquid crystal panel 123 and may be disposed at a rear of the liquid crystal panel 123.

In order to prevent an increase in the overall thickness of the LCD 108, the light guide plate 250 may have a wedge-shaped structure tapering from the light source units 178 to the PCB 128.

If a circuit board 176 and a film module 186 overlap each other, signal interference may occur. In order to prevent signal interference between the circuit board 176 and the film module 186, the circuit board 176 and the film module 186 may be arranged so as not to overlap each other. The circuit board 176 may connect the PCB 128 and the light source units 178 by extending substantially horizontally along the surface of the bottom of the LCD 108.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display comprising:
a liquid crystal panel including short sides and long sides;
a plurality of gate lines disposed on the liquid crystal panel and extending substantially in parallel with the short sides of the liquid crystal panel;
a plurality of data lines insulated from the gate lines, intersecting the gate lines and extending substantially in parallel with the long sides of the liquid crystal panel;
a printed circuit board disposed near a short side of the liquid crystal panel and providing an image signal to the liquid crystal panel;
a light guide plate overlapping the liquid crystal panel;
a light source unit generating and providing light to the light guide plate;
a circuit board on which the light source unit is mounted; and
a film module which connects the printed circuit board to an external controller and overlaps the liquid crystal panel.

2. The liquid crystal display of claim 1, further comprising:
a gate driving module connected to the gate lines, disposed on the liquid crystal panel as an integrated circuit and disposed near a long side of the liquid crystal panel; and
a data driving module connected to the data lines and disposed near a short side of the liquid crystal panel.

3. The liquid crystal display of claim 1, wherein the printed circuit board includes
a first connector connected to the film module, and
a second connector connected to the circuit board on which the light source unit is mounted.

4. The liquid crystal display of claim 3, wherein a connection terminal of the first connector faces the liquid crystal panel.

5. The liquid crystal display of claim 4, wherein a connection terminal of the second connector faces the liquid crystal panel.

6. The liquid crystal display of claim 3, wherein the film module and the circuit board do not overlap each other.

7. The liquid crystal display of claim 1, further comprising a chip film package connecting the printed circuit board and the data lines.

8. The liquid crystal display of claim 1, further comprising:
a chip-on-glass chip mounted on the liquid crystal panel; and
a circuit film connecting the chip-on-glass chip and the printed circuit board.

9. The liquid crystal display of claim 1, wherein a surface of the printed circuit board is disposed substantially coplanar with a surface of the liquid crystal panel.

10. The liquid crystal display of claim 9, wherein the light source unit is disposed adjacent to one side of the light guide plate, and arranged substantially parallel to the long sides of the liquid crystal panel.

11. The liquid crystal display of claim 9, wherein the light source unit is disposed between the printed circuit board and the liquid crystal panel, and arranged substantially parallel to the short sides of the liquid crystal panel.

12. The liquid crystal display of claim 9, wherein the light source unit is arranged near one of the short sides of the liquid crystal panel which is more distant from the printed circuit board than the remaining short side.

13. The liquid crystal display of claim 1, wherein the printed circuit board is disposed overlapping one of the short sides of the liquid crystal panel and overlapping a bottom of the liquid crystal panel.

14. The liquid crystal display of claim 13, wherein the light source unit is disposed adjacent to one side of the light guide plate and arranged substantially parallel to the long sides of the liquid crystal panel.

15. The liquid crystal display of claim 13, wherein the light source unit is disposed adjacent to one of the short sides of the liquid crystal panel which is more distant from the printed circuit board than the remaining short side.

16. The liquid crystal display of claim 15, wherein the light guide plate has a wedge-shaped structure tapering in a direction from the light source unit to the printed circuit board.

17. A liquid crystal display, comprising:
   a liquid crystal panel including short sides and long sides;
   a plurality of gate lines disposed on the liquid crystal panel and extending substantially in parallel with the short sides;
   a gate driving module connected to the gate lines, disposed on the liquid crystal panel as an integrated circuit and disposed extending substantially parallel with the long sides of the liquid crystal panel;
   a plurality of data lines insulated from the gate lines, intersecting the gate lines and extending substantially in parallel with the long sides of the liquid crystal panel;
   a data driving module connected to the data lines and disposed near a short side of the liquid crystal panel;
   a printed circuit board disposed near a short side of the liquid crystal panel, and providing an image signal to the liquid crystal panel; and
   a film module which connects the printed circuit board to an external controller and overlaps the liquid crystal panel.

18. The liquid crystal display of claim 17, wherein:
   the liquid crystal panel includes a pixel array in which a plurality of pixels are arranged substantially in a matrix; and
   each of the pixels longitudinally extends substantially in parallel with the short sides of the liquid crystal panel, and transversely extends substantially in parallel with the long sides of the liquid crystal panel.

19. The liquid crystal display of claim 18, wherein:
   a number of pixels adjacent to one another in a direction substantially parallel with the short sides of the liquid crystal panel represent the same color; and
   three pixels respectively representing red, green and blue are alternately arranged in the pixel array in a direction substantially parallel with the long sides of the liquid crystal panel.

20. The liquid crystal display of claim 17, wherein the data driving module includes a chip-on-film, a tape carrier package or a chip-on-glass.

21. The liquid crystal display of claim 2, wherein the printed circuit board includes
   a first connector connected to the film module, and
   a second connector connected to the circuit board on which the light source unit is mounted.

22. The liquid crystal display of claim 2, further comprising a chip film package connecting the printed circuit board and the data lines.

23. The liquid crystal display of claim 2, further comprising:
   a chip-on-glass chip mounted on the liquid crystal panel; and
   a circuit film connecting the chip-on-glass chip and the printed circuit board.

24. The liquid crystal display of claim 2, wherein a surface of the printed circuit board is disposed substantially coplanar with a surface of the liquid crystal panel.

25. The liquid crystal display of claim 2, wherein the printed circuit board is disposed overlapping one of the short sides of the liquid crystal panel and overlapping a bottom of the liquid crystal panel.

26. The liquid crystal display of claim 3, further comprising a chip film package connecting the printed circuit board and the data lines.

27. The liquid crystal display of claim 3, further comprising:
   a chip-on-glass chip mounted on the liquid crystal panel; and
   a circuit film connecting the chip-on-glass chip and the printed circuit board.

28. The liquid crystal display of claim 3, wherein a surface of the printed circuit board is disposed substantially coplanar with a surface of the liquid crystal panel.

29. The liquid crystal display of claim 3, wherein the printed circuit board is disposed overlapping one of the short sides of the liquid crystal panel and overlapping a bottom of the liquid crystal panel.

30. The liquid crystal display of claim 7, wherein a surface of the printed circuit board is disposed substantially coplanar with a surface of the liquid crystal panel.

31. The liquid crystal display of claim 7, wherein the printed circuit board is disposed overlapping one of the short sides of the liquid crystal panel and overlapping a bottom of the liquid crystal panel.

32. The liquid crystal display of claim 8, wherein a surface of the printed circuit board is disposed substantially coplanar with a surface of the liquid crystal panel.

33. The liquid crystal display of claim 8, wherein the printed circuit board is disposed overlapping one of the short sides of the liquid crystal panel and overlapping a bottom of the liquid crystal panel.

34. The liquid crystal display of claim 1, wherein the light guide plate has a wedge-shaped structure tapering in a direction from the light source unit to the printed circuit board.

* * * * *